July 23, 1940.   C. M. HINES   2,208,739
BRAKE AND SANDING CONTROL MEANS
Filed Nov. 30, 1939   4 Sheets-Sheet 1

Fig.1A

INVENTOR
CLAUDE M. HINES
BY
ATTORNEY

July 23, 1940.                C. M. HINES                2,208,739
              BRAKE AND SANDING CONTROL MEANS
          Filed Nov. 30, 1939            4 Sheets-Sheet 4

INVENTOR
CLAUDE M. HINES
BY

ATTORNEY

Patented July 23, 1940

2,208,739

UNITED STATES PATENT OFFICE 2,208,739

BRAKE AND SANDING CONTROL MEANS

Claude M. Hines, Pittsburgh, Pa., assignor to The Westinghouse Air Brake Company, Wilmerding, Pa., a corporation of Pennsylvania Application November 30, 1939, Serial No. 306,891

19 Claims. (Cl. 291—2)

This invention relates to brake and sanding control means for vehicles, such as railway cars or trains, and has particular relation to apparatus automatically responsive to the rate of retardation and of acceleration of individual vehicle wheels or pairs of wheels for so controlling the braking and sanding operation as to prevent sliding of the vehicle wheels.

It is well known that if the brakes associated with a vehicle wheel are applied with sufficient force to exceed the adhesion or rolling friction between the wheel and the road surface or rail, the wheel slips, that is, decelerates at a rapid rate to a locked-wheel condition and slides. In the present application, the term "slip" designates the rotation of the vehicle wheel at a speed less than a speed corresponding to vehicle speed at a given instant whereas the term "slide" refers to the dragging of a vehicle wheel along a road surface or a rail in a locked condition.

In my copending application Serial No. 299,996, filed October 18, 1939, and assigned to the same assignee as the present application, there are disclosed a number of brake and sanding control equipments including electrical apparatus responsive to the rate of retardation of an individual pair of wheels, or wheel and axle unit, for effecting sanding of the rails in advance of all wheels on a car or train when one or more wheel and axle units exceed a certain rate of retardation and effective when an individual wheel and axle unit slips to cause a rapid release of the brakes associated with the car truck having the slipping wheel and axle unit.

In the various types of equipment disclosed in my copending application Serial No. 299,996 the rapid release of the brakes is produced by a rapid reduction of brake cylinder pressure and the apparatus is so constructed and arranged that once the rapid release of fluid under pressure from the brake cylinder is initiated in response to the slipping of the wheel and axle unit, it is continued automatically until the brake cylinder pressure reduces below a certain low value sufficient to insure the return of the slipping wheel and axle unit back toward a speed corresponding to vehicle speed before the slipping wheel and axle unit can attain a locked condition and slide.

Such an arrangement necessarily involves, in some cases, the unnecessary wasting of air by venting from the brake cylinder after the slipping wheel and axle unit has begun to accelerate back toward a speed corresponding to vehicle speed. It is desirable, therefore, to avoid the unnecessary venting of the brake cylinder and to cause venting of the brake cylinder to such a degree only as will insure the return of the slipping wheel and axle unit back toward a speed corresponding to vehicle speed.

In the copending application, Serial No. 248,654 of J. C. McCune, filed December 31, 1938, and assigned to the assignee of the present application, there is disclosed a vehicle brake control apparatus, including a mechanical device responsive to the rate of rotative retardation and acceleration of an individual wheel and axle unit, for initiating the rapid release of the brakes associated with the wheel and axle unit when the wheels begin to slip and for causing the continued release of fluid under pressure from the brake cylinder until the slipping wheel and axle unit begins to accelerate at a rate in excess of a certain rate, at which time the release of fluid under pressure from the brake cylinder is cut off and the resupply of fluid under pressure to the brake cylinder is initiated to effect the reapplication of the brakes.

It is an object of my present invention to provide a vehicle brake control equipment of the type disclosed in my prior copending application Serial No. 299,996 adapted in novel manner to cause automatic termination of reduction in brake cylinder pressure and initiation of resupply to the brake cylinder in response to the acceleration of a slipping wheel at a rate exceeding a certain rate.

It is another object of my invention to provide a vehicle brake control equipment of the type indicated in the foregoing object and further characterized by safety means for insuring reapplication of the brakes if reapplication is not effected in response to acceleration of a slipping wheel back toward vehicle speed.

It is another object of my invention to provide a vehicle brake control equipment of the type indicated in the foregoing objects and including an arrangement for effecting sanding automatically in response to the rotative deceleration of a vehicle wheel at a rate exceeding a certain rate.

The above objects, and other objects of my invention which will be made apparent hereinafter, are attained in two illustrative embodiments of my invention subsequently to be described and shown in the accompanying drawings, wherein—

Figure 1A:
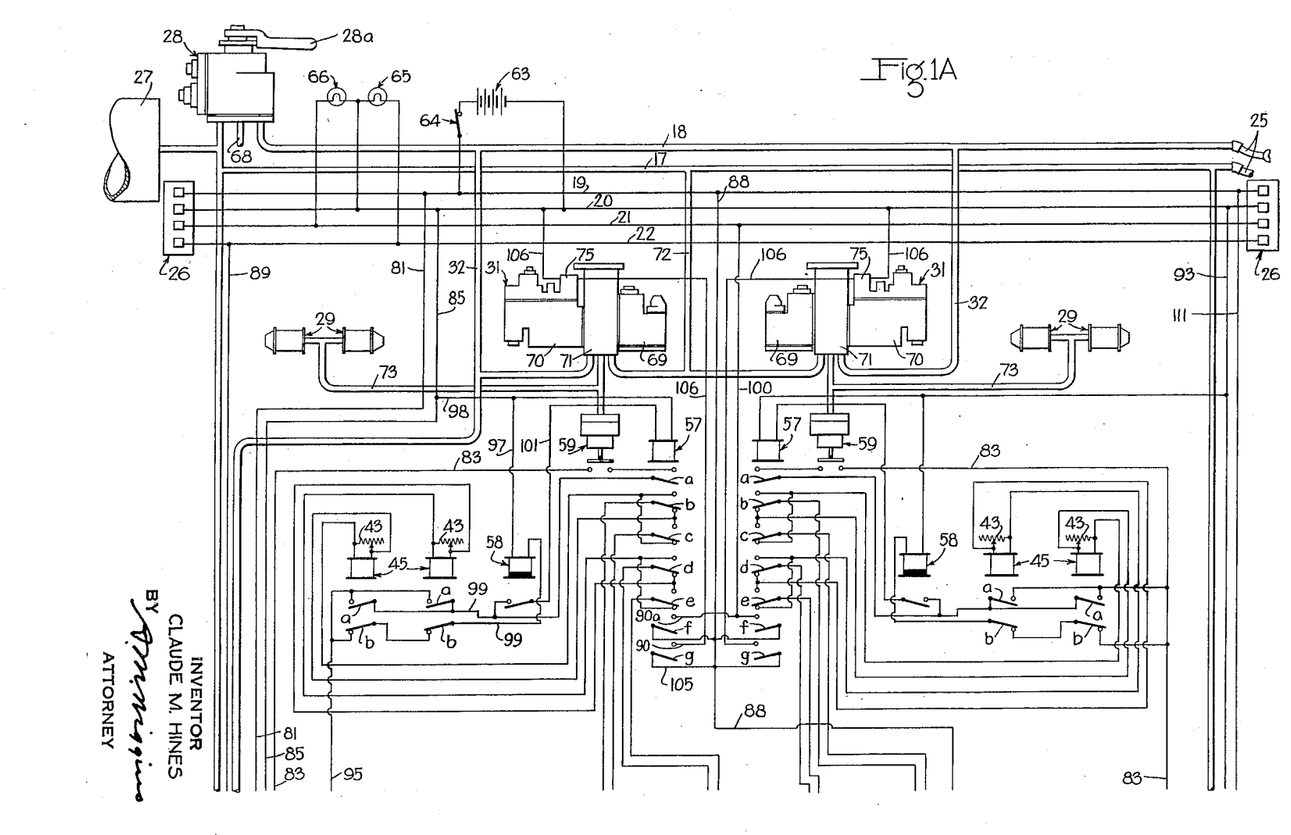
Figs. 1A and 1B, taken together, show one type of brake and sanding control apparatus, and Figs. 2A and 2B, taken together, show a modification of the equipment shown in Figs. 1A and 1B.
Figure 1B:
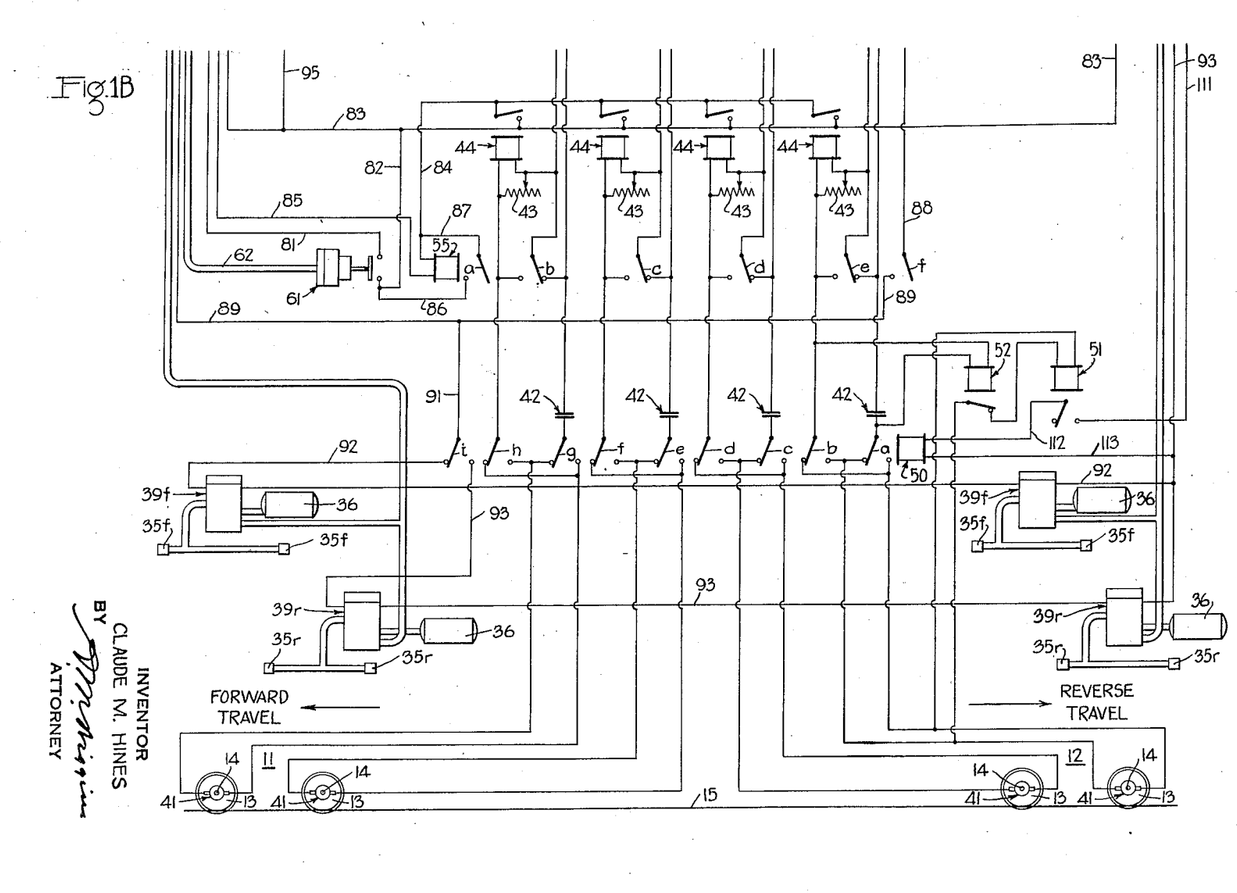

Description of embodiment shown in Figures 1A and 1B

The apparatus shown in Figs. 1A and 1B represents that for a single railway car having two four-wheel trucks 11 and 12, referred to hereinafter as the front wheel truck and rear wheel truck respectively. It will be apparent that only one wheel 13 of the leading and trailing axles of each truck are shown in the drawings and that, as a matter of fact, two wheels 13 are fixed in conventional manner at opposite ends of each axle 14 thereby constituting a wheel and axle unit. The rail on which the wheels 13 roll is indicated by the line 15.

For purposes of the present application, a simplified fluid pressure brake apparatus of the single-end type is provided but it will be understood that I contemplate the application of my invention to any suitable or conventional fluid pressure brake apparatus of either the single-end or double-end type.

The apparatus shown comprises a pair of pipes or conduits 17 and 18, hereinafter designated the supply pipe and the control pipe respectively and a plurality of train wires 19, 20, 21 and 22, which pipes and wires extend longitudinally from end to end of the car. In the case of a train of cars, the sections of the pipes 17 and 18 on successive cars are connected in the usual manner through hose couplings 25 and the sections of the train wires on successive cars are connected by suitable couplers 26, either of the manual or the automatic type.

The supply pipe 17 is constantly connected to and charged with fluid under pressure from a reservoir 27, hereinafter designated the main reservoir, which is in turn charged by a fluid compressor not shown. The control pipe 18 is normally at atmospheric pressure and is charged to a desired pressure by fluid supplied from the main reservoir 27 under the control of a manually operated brake valve 28 of the self-lapping type.

Suitable friction brake devices or shoes, not shown, are associated in the usual manner with the car wheels 13, which brake devices are operated by suitable brake cylinders 29. As shown, a brake cylinder 29 is provided for each axle of each wheel truck but it will be understood that any desired number of brake cylinders may be provided for each truck. Fluid under pressure is supplied to the brake cylinders 29 of each wheel truck to effect application of the brakes and released from the brake cylinders to effect release of the brakes, under the control of a brake control valve mechanism 31.

As will be explained in further detail hereinafter each of the valve mechanisms 31 is connected by a branch pipe 32 to the control pipe 18 and the valve mechanisms are thereby operatively controlled according to variations of pressure in the control pipe 18 to correspondingly vary the pressure in the brake cylinders 29 of the corresponding wheel truck.

Each wheel truck is provided with a plurality, illustrated as two, of sanding devices 35f effective to cause deposition of sand in advance of all the wheels of the truck when the car is traveling in a forward direction, assumed to be the left-hand direction indicated by the arrow in the lower left-hand corner of Fig. 1B. In a similar manner, each wheel truck is provided with two or more sanding devices 35r effective to cause sand to be deposited in advance of all wheels of the truck when the car is traveling in the reverse or right-hand direction indicated by the arrow in the lower right-hand corner of Fig. 1B.

The sanding devices 35f and 35r are of conventional type and therefore require no description, it being understood that they are effective to cause sanding only as long as fluid under pressure is supplied thereto.

Fluid under pressure is supplied selectively from one of two sanding reservoirs 36 to the sanding devices 35f and 35r of each wheel truck under the control of corresponding magnet valve devices 39f and 39r. Magnet valve devices 39f and 39r are of the well known double-beat valve type and accordingly a functional description thereof is deemed sufficient. When the magnet winding of either of the magnet valve devices 39f and 39r is deenergized, as it normally is, the magnet valve device establishes communication between a branch pipe 37 of the supply pipe 17 and the corresponding sanding reservoir 36 to effect charging thereof. When the magnet winding of either of the magnet valve devices 39f and 39r is energized, the charging communication is closed and a communication is established through which fluid under pressure is discharged from the corresponding reservoir 36 to atmosphere through the sanding devices 35f or 35r, thereby causing the sanding devices to effect sanding.

The volume of the sanding reservoirs 36 is such that the fluid under pressure therein is exhausted through the sanding devices 35f or 35r within a certain time, such as 10 or 15 seconds, after the magnet valve device asssociated therewith is energized. Thus, although the magnet valve devices 39f and 39r remain energized, sanding is effected only for a certain length of time.

The equipment further includes electrical apparatus, of the character disclosed in my above-mentioned copending application, Serial No. 299,996, for registering and measuring the rate of rotative deceleration and acceleration of an individual wheel and axle unit, which electrical apparatus is adapted to control the sanding magnet valves 39f and 39r so as to effect sanding and also to control the valve mechanism 31 of the corresponding wheel truck so as to cause operation thereof to effect release of the brakes on that truck.

This electrical apparatus for each wheel and axle unit is diagrammatically shown in Fig. 1B as including a generator 41 of the direct-current type, each generator being arranged to be driven by rotation of the corresponding axle and designed to produce a voltage which is substantially proportional to the speed of rotation of the axle and of the wheels affixed thereto. The generator 41 may be mounted in the journal housing at one end of an axle in such manner that the rotary shaft of the generator is coupled to the end of the axle in coaxial relation, or any other suitable driving arrangement may be employed.

The electrical apparatus associated with each wheel and axle unit includes, further, an electrical condenser 42 and two current-responsive relays 44 and 45 hereinafter designated the sand control relay and brake control relay respectively. As will be apparent from subsequent description, the coils of the relays 44 and 45 and the condenser 42 are connected in series-circuit relation across the brush terminals of the corresponding generator 41. Thus when a car wheel rotatively accelerates, the voltage of the corresponding generator 41 increases proportionately and the condenser 42 is accordingly charged by a current that varies in value according to the rate of increase of the generator voltage. Conversely, when a car wheel 13 rotatively decelerates, the generator voltage decreases proportionately and current is accordingly discharged from the condenser 42 in a reverse direction, the value of the discharge current depending upon and being proportional to the rate of deceleration of the car wheel.

The relays 44 and 45 are conventional relays which are operatively responsive to current flow through the coil thereof in only one direction. Each of the sand control relays 44 has a single contact member that is actuated to a picked-up or closed position from an open position only when the coil of the relay is energized by a current in excess of a certain value and in one certain direction. In a similar manner each of the brake control relays 45 is provided with two contact members designated $a$ and $b$ respectively. The contact members $a$ of the relays 45 are so-called front contacts which are picked-up, or actuated to closed position, when the operating coil of the relay is energized by current in excess of a certain value and in one certain direction. The contact members $b$ of the relays 45 are so-called back contacts which are in a closed position as long as the coil of the relay is deenergized or energized by current flowing through the operating coil of the relay in the wrong direction. When the operating coil of the relays 46 is energized by current in excess of a certain value and in the proper direction, the contact member $b$ is actuated to an open position.

The operating coil of each of the relays 44 and 45 is shunted by an adjustable resistor 43 which is effective to control the value of the current at which the relay picks up.

As will be hereinafter more fully explained, the adjustable resistor 43 associated with the relays 44 are so adjusted as to cause the relays to pick up in response to a current in excess of a certain value corresponding to a certain rate of rotative deceleration of the car wheel, which occurs ordinarily when the wheels are not slipping but which occurs also when the wheels slip. The resistors 43 associated with the coils of the relays 45 are so adjusted as to cause the relays to be picked up by a current in the proper direction and exceeding a second certain value higher than that at which the relay 44 is picked up and corresponding to a rate of rotative deceleration or acceleration of a wheel and axle unit which occurs only while a wheel and axle unit slips.

As will be made apparent hereinafter, the relays 45 function during rotative deceleration of the vehicle wheels, while slipping, to initiate operation of the brake control valve mechanism 31 to effect a rapid release of the brakes and function during acceleration of the wheels back toward a speed corresponding to vehicle speed to so control the control valve mechanism 31 as to terminate the release of the brakes and initiate reapplication thereof. This is a particular feature of my present invention. In order to insure the proper direction of flow of current through the coils of the relays 44 and 45 so as to always pick up the relays during retardation of the vehicle wheel, notwithstanding a reversal of direction of travel of the vehicle and the consequent reversal of the direction of rotation of the car wheels, a reversing relay 50 is provided. Relay 50 is a conventional relay having a suitable operating coil and a plurality of two-position contact members $a, b, c, d, e, f, g, h$ and $i$ respectively.

The operating coil of the reversing relay 50 is energized or deenergized under the control of a directional relay 51 of the polarized type. The directional relay 51 is a conventional polarized relay having a suitable operating coil and a contact member which is actuated to one or the other of two positions depending upon the direction of flow of current through the operating coil. As will be seen in Fig. 1B, the operating coil of the polarized relay 51 is connected across the brush terminals of one of the axle-driven generators 41, shown as the axle-driven generator associated with the trailing axle of the rear wheel truck 12. The arrangement of the polarized relay 51 is such that when the car or train is traveling in a forward direction, the polarity at the brush terminals of the generator 41 on the trailing axle of the rear wheel truck is such to cause flow of current through the operating coil of the polarized relay 51 in a direction to actuate the contact member of the relay to its left-hand position shown, thereby interrupting the energizing circuit for the operating coil of the reversing relay 50. When the direction of travel of the car or train and consequently the direction of rotation of the vehicle wheels 13 is reversed, the polarity at the brush terminals of the generator 41 associated with the trailing axle of the rear wheel truck is reversed and consequently the direction of flow of current through the coil of the polarized relay 51 is also reversed. The contact member of the polarized relay 51 is correspondingly actuated to the right-hand position thereof in response to the reverse travel of the car or vehicle. In the latter position, the contact member of relay 51 completes a circuit for energizing the operating coil of the reversing relay 50 which circuit will hereinafter be traced.

It will accordingly be seen that when the car or train is traveling in a forward direction, the contact members of the reversing relay 50 are in their dropped-out positions as shown in Fig. 1B, and when the car or train is traveling in the reverse direction, the contact members of the reversing relay are in their opposite or picked-up positions, respectively. Thus, notwithstanding a reversal of direction of travel of the car or train, the direction of flow of charging current and discharging current to and from the condenser 42 in each generator circuit for acceleration and deceleration of the vehicle wheels is always the same.

Associated with the directional relay 51 is a cut-out relay 52 of conventional neutral type having a single "back-contact" member, and an operating coil which is connected across the brush terminals of the generator 41 associated with the trailing axle of the rear wheel truck subject to the control of the reversing contact members $a$ and $b$ of the reversing relay 50 so that regardless of the direction of travel of the car or train, current always flows through the operating coil of the relay in the same direction. The operating coil of the cut-off relay 52 is so designed as to pick up the back-contact member thereof and thereby interrupt the connection of the operating coil of the directional relay 51 across the brush terminals of the associated generator 41 whenever the voltage across the brush terminals of the generator exceeds a certain value which is not attained until after the directional relay 51 has been actuated to the proper position corresponding to the direction of travel of the car or train.

It is desirable to disconnect the operating coil of the directional relay 51 from the generator circuit after it has once been actuated to the proper position corresponding to the direction of travel of the car or train in order to prevent diversion of current from the circuit of the relays 44 and 45 by flow through the operating coil of the directional relay 51 and also to avoid continued energization of the coil. It should be understood that once the contact member of polarized relay 51 is actuated to a particular position, it remains firmly in such position thereafter unless the direction of current flow through the operating coil is reversed. Thus, when the cut-out relay 52 is actuated to interrupt the energizing circuit for the operating coil of the directional relay 51, the position of the contact member of the polarized relay is unchanged.

The contact member $i$ of the reversing relay 50 is effective depending upon the position thereof to selectively control energization of the sanding magnet valves 39$f$ and 39$r$.

Associated with all of the sand control relays 44 is a relay 55 of the conventional neutral type having a suitable operating coil and a plurality of contact members $a$, $b$, $c$, $d$, $e$, and $f$, respectively. Relay 55, which will hereinafter be called the sanding relay, is so arranged that its operating coil is energized whenever any of the sand control relays 44 is picked-up and is effective, through the contact member $f$ thereof, as long as the operating coil thereof is energized, to cause selective energization of the sanding magnet valves 39$f$ or 39$r$ depending upon the position of the contact member $i$ of the reversing relay 50.

The contact members $b$, $c$, $d$, and $e$ of sanding relay 55 are effective in their dropped-out positions, while the relay coil is deenergized, to short-circuit the operating coils of the relays 45 in the several generator circuits and are effective in their picked-up positions, while the relay coil is energized, to remove the short-circuit connection around the operating coils of the relays 45 and at the same time short-circuit the operating coils of the several relays 44.

It will accordingly be seen that the relay 55 selectively renders only one of the relays 44 or 45 in each generator circuit effective at one time to have current flow therethrough, thus minimizing the resistance in each generator circuit and enabling the relays 44 and 45 to be made more sensitive to variations of current in the circuit. This particular feature of the apparatus disclosed is not a part of my present invention.

The apparatus shown further comprises a so-called brake relay 57 for each wheel truck. The relays 57 are of conventional neutral type having a suitable operating coil and a plurality of contact members $a$, $b$, $c$, $d$, $e$, $f$, and $g$, respectively.

Certain of the contact members of the relay 57 are effective, in a manner subsequently to be described, to reverse the terminal connections of the operating coil of each of the relays 45 in the corresponding generator circuit so as to permit the relay to be operated at one time in response to retardation of the vehicle wheels and at another time in response to acceleration of the vehicle wheels. Certain other contacts of the relays 57 are effective to control the operation of the brake control valve mechanism 31 for the corresponding truck.

The operating coil of each of the relays 57 is energized and deenergized under the control of either of the brake control relays 45 of the corresponding truck and an additional relay 58. The relay 58 is a conventional relay of the slow-releasing type having a suitable operating coil and a single "front-contact" member which is actuated promptly to a closed position upon energization of the operating coil and which is maintained in a picked-up or closed position for a certain interval of time, such a fractional portion of a second, following deenergization of the operating coil of the relay for a purpose hereinafter to be made apparent.

Associated with each of the relays 57 is a pressure-operated switch 59 of any suitable construction and responsive to the pressure in the brake cylinders 29 of the corresponding wheel truck. The pressure-operated switches 59 are so designed as to be operated to closed position in response to the pressure in the corresponding brake cylinders 29 and to open only when the operating pressure reduces below a certain low value, such as 10 pounds per square inch.

Another pressure-operated switch 61 is provided which is subject, through a branch pipe 62, to the pressure in the control pipe 18 and which is operatively controlled according to the pressure in the control pipe 18 so as to be in a closed position only as long as the pressure in the control pipe exceeds a certain low value, such as 5 pounds per square inch.

The apparatus further includes a source of electrical energy, such as a storage battery 63, which is maintained charged by suitable charging equipment, not shown. The positive and negative terminals of the battery 63 are connected to the train wires 19 and 20 respectively under the control of a suitable switch, such as a knife switch 64 shown. The train wire 19 is accordingly hereinafter referred to as the positive battery wire and the train wire 20 as the negative battery wire and, for simplicity, circuits will be traced from the positive battery wire to the negative battery wire without reference to the battery 63.

The two train wires 21 and 22 are hereinafter designated the indicating wire and sanding wire respectively. Two indicating lamps 65 and 66 are provided in a suitable location visible to the operator for indicating the sanding operation and brake release operation, respectively. The indicating lamp 65 is connected across the sanding wire and the negative battery wire. Since the sanding wire 22 is energized in the manner hereinafter described whenever sanding is effected, it will be apparent that the indicating lamp 65 will be illuminated to indicate such fact.

The indicating lamp 66 is connected across the indicating wire 21 and the negative battery wire 20. Since the indicating wire 21 is energized in the manner hereinafter described, whenever an automatic brake release operation occurs, it will be apparent that the indicating lamp 66 will be illuminated to indicate such fact.

Before describing the operation of the apparatus, a brief description of the brake valve 28 and brake control mechanism 31 will be given. Brake valve 28 is of the type described and claimed in Patent 2,042,112 of Ewing K. Lynn and Rankin J. Bush, and a detailed description thereof is accordingly deemed unnecessary. Briefly, however, the brake valve 28 has an operating handle 28$a$ that is shiftable rotarily in a horizontal plane to operate a rotary shaft of the brake valve device. In the normal or release position of the brake valve handle, the brake valve device is conditioned to vent the control pipe 18 through the exhaust port 68 thereof. When the brake valve handle is shifted out of its release position into a zone, referred to as the application zone, the brake valve device is operative to supply fluid under pressure to the control pipe 18 from the main reservoir 27 and automatically establish a pressure in pipe 18 which corresponds to the degree of displacement of the brake valve handle out of its position. If the pressure in the control pipe 18 reduces from a value corresponding to the position of the brake valve handle, the brake valve device is effective to automatically supply fluid under pressure to the control pipe to maintain such pressure therein.

The valve mechanism 31 is described in detail and claimed in the copending application Serial No. 292,833, of Donald L. McNeal, filed August 1, 1939, and assigned to the assignee of this application. Since reference may be had to the copending application just mentioned for details of construction of the valve mechanism 31, a brief functional description only is believed necessary for purposes of the present application. The valve mechanism 31 comprises a relay valve portion 69 and a magnet valve portion 70 secured to opposite sides of a pipe bracket portion 71. The relay valve portion comprises a self-lapping valve mechanism including an operating piston that is operatively controlled by the pressure of the fluid in the control pipe 18 as supplied through the branch pipe 32. The relay valve portion of each valve portion 31 is operative according to the pressure established in the control pipe 18 to supply fluid under pressure from a branch pipe 72 of the supply pipe 17 to the brake cylinder pipe 73 leading to the brake cylinders 29 for the corresponding wheel truck and establish a pressure in the brake cylinders corresponding or proportional to the pressure established in the control pipe 18.

The magnet valve portion 70 of the valve mechanism 31 includes a magnet valve device 75. The magnet valve device is effective when deenergized to permit the flow of fluid under pressure from the branch pipe 32 to the operating piston of the relay valve 69 and, when energized to cut off the supply of fluid under pressure to and release fluid under pressure from the operating piston of the relay valve portion 69.

The magnet valve portion 70 of the valve mechanism 31, furthermore, includes valve mechanism which is effective, once the magnet valve device 75 is energized, to cause the rate of flow of fluid under pressure from the control pipe to the operating piston of the relay valve portion 69 to be thereafter restricted to a rate lower than the normal rate as long as the pressure established in the control pipe exceeds a certain low pressure such as five pounds per square inch.

*Operation of equipment shown in Figures 1A and 1B*

Let it be assumed that the main reservoir 27 is charged to the normal pressure carried therein, such as 100 pounds per square inch, and that the supply pipe 17 and sanding reservoirs 36 are correspondingly charged with fluid under pressure. Let it be further assumed that the switch 64 is in closed position connecting the battery 63 across the positive and negative battery wires 19 and 20, that the brake valve handle 28a is in its normal brake release position so that the brakes on the car are released, and that the car is traveling in the left-hand or forward direction while under power or coasting.

If, now, the operator desires to effect an application of the brakes, he first shuts off the propulsion power, if the power is on, and then operates the brake valve handle 28a out of its release position into the application zone an amount corresponding to the desired degree of application of the brakes. The control pipe 18 is accordingly charged to a pressure corresponding to the application position of the brake valve handle, for example 40 pounds per square inch. The relay valve portion 69 of each of the valve mechanisms 31 is accordingly operated to supply fluid under pressure to the corresponding brake cylinders 29, the pressure established in the brake cylinders corresponding to or being proportional to the pressure established in the control pipe 18. The pressure switches 59 and 61 are operated to their closed positions in response to the assumed pressure established in the control pipe and brake cylinders and function for purposes hereinafter made apparent.

The operator may vary the degree of brake cylinder pressure and, correspondingly the degree of application of the brakes, as desired by merely varying the position of the brake valve handle, the degree of application of the brakes increasing with increased displacement of the brake valve handle out of a release position and decreasing with decreased displacement of the brake valve handle from the release position.

In order to effect the release of the brakes, the operator shifts the brake valve handle 28a back to its release position, thus restoring the control pipe 18 to its normal atmospheric pressure. The relay valve portion 69 of each valve mechanism 31 accordingly operates in response to the reduction of pressure in the control pipe 18 to effect a corresponding reduction of pressure in the associated brake cylinders 29, thus completely venting the brake cylinders and causing complete release of the brakes.

As long as the rate of rotative deceleration of each wheel and axle unit during application of the brakes does not exceed the rate sufficient to cause pick-up of the corresponding sand control relays 44, the sand control relays 44 as well as the brake control relays 45 associated with all of the axle-driven generators 41 are not operated.

Let it be assumed, however, that while the car is traveling at a high speed the brakes are applied to a sufficient degree to cause all of the car wheels 13 to rotatively decelerate at a rate sufficient to cause substantially simultaneous pick-up of all the sand control relays 44.

As will be apparent in Fig. 1B, the contact members of the sand control relays 44 are connected in parallel relation. Accordingly each of the relays 44 is effective when picked-up to establish the same energizing circuit for the operating coil of the sand relay 55. The circuit for energizing the sand relay 55 extends from the positive battery wire 19 by way of a branch wire 81, pressure switch 61, wires 82 and 83, in parallel through the contact members of the several sand control relays 44, a wire 84, the operating coil of the sand relay 55, and a branch wire 85 back to the negative battery wire 20.

The contact members of sand relay 55 are accordingly actuated to the picked-up position thereof at the instant the rate of rotative deceleration of one or more of the vehicle wheels 13 exceeds a certain rate which as previously explained is a rate which may be attained without slipping of any of the vehicle wheels.

The contact member a of sand relay 55 is effective in its picked-up position to establish a holding circuit for maintaining the operating coil of the relay 55 energized independently of the contact members of the sand control relays 44. The holding circuit extends from the positive battery wire 19 by way of the branch wire 81, pressure switch 61, a wire 86, contact member a of the sand relay 55, wires 87 and 84, the operating coil of the relay 55 and wire 85 back to the negative battery wire 20. It will accordingly be seen that once the operating coil of the sand relay 55 is energized, it is thereafter maintained energized until the pressure switch 61 is opened.

The contact member f of sand relay 55 is effective in its picked-up position to establish a circuit for energizing the forward sanding magnet valve 39f for each wheel truck. This circuit extends from the positive battery wire 19 by way of a wire 88, contact member f of the sand relay 55, a wire 89, and branch wire 91, contact member i of the reversing relay 50 in the dropped-out position shown and corresponding to the forward direction of travel of the car, wire 92, in series relation through the electromagnet windings of the magnet valve devices 39f for the front and rear wheel trucks 11 and 12, and to the negative battery wire by a branch wire 93.

Magnet valve devices 39f on both the front and rear wheel trucks are accordingly operated to cause fluid under pressure to be supplied from the sanding reservoirs 36 to the sanding devices 35f which accordingly effect sanding of the rails in advance of the vehicle wheels on the two trucks. As previously explained, the sanding continues for a certain length of time as determined by the length of time required for the fluid under pressure in the sand reservoirs 36 to exhaust through the sanding devices 35. Thus, notwithstanding the fact that the sand relay 55 remains picked-up indefinitely, sanding of the rails occurs only for a certain length of time which is preferably that corresponding to the normal time required to bring a car or train to a stop from an average speed.

At the same time that the magnet valve devices 39f are energized, the sanding wire 22 is also connected to the positive battery wire by contact member f of sand relay 55 due to wire 89 being connected to the sanding wire. Thus, if for some reason the sand relay 55 on any other cars of a train has not yet operated, sanding will be effected on the other cars due to energization of the sanding magnet valves 39f directly from the sanding wire 22 independently of the sand relay 55 on the same car.

As previously explained, the contact members b, c, d, and e of the sand relay 55 are respectively effective in the dropped-out position thereof to short-circuit the operating coil of the brake control relays 45 in the corresponding generator circuits. Accordingly, when the sand relay 55 is picked up, the short-circuit around the coil of the brake control relays 45 of all the generator circuits on the same car is removed and, at the same time, a short-circuit connection is established around the operating coil of the sand control relays 44 in all the generator circuits by the contact members b, c, d, and e of the sand relay 55. It will thus be seen that initially only the operating coil of the sand control relays 44 is in the corresponding generator circuit and, once the sand relay 55 is picked-up, only the coil of the brake control relay 45 is in the corresponding generator circuit. The resistance in the circuit of each generator is thus kept a minimum so as to render the relays 44 and 45 extremely sensitive to variations in the rate of change of wheel speed.

Upon the sanding of the rails, the adhesion of the wheels to the rails is improved to such an extent as to possibly forestall or prevent slipping of the wheels in response to the particular degree of application of the brakes.

If now, notwithstanding the sanding of the rails, an individual wheel and axle unit, such as the trailing wheel and axle unit of the front wheel truck begins to slip, the corresponding brake control relay 45 is picked-up.

As long as the two brake control relays 45 for the front wheel truck were deenergized, a circuit was established for energizing the operating coil of the relay 58. This circuit extends from the positive battery wire 19 by way of the wire 81, pressure switch 61, wires 82 and 83, a branch wire 95, in series through the back-contact members b of the two brake control relays 45 of the front wheel truck, a wire 96, the operating coil of relay 58, wires 97 and 98, and branch wire 85 to the negative battery wire 20.

With the contact member of the relay 58 in its closed position in response to the energization of the operating coil of the relay 58, the pick-up of either of the brake control relays 45 and the consequent closure of the contact member a thereof establishes a circuit for energizing the operating coil of the brake relay 57 for the front wheel truck. This circuit extends from the positive battery wire 19 by way of the branch wire 81, pressure switch 61, wires 82, 83, and 95, contact member a of the brake control relay 45 in the generator circuit for the trailing axle of the front wheel truck, a wire 99, the contact member of the relay 58, a wire 101, operating coil of the relay 57, and wires 98 and 85 to the negative battery wire 20.

Upon the pick-up of the relay 45 as just described, the corresponding back-contact member b is shifted to open position, thereby interrupting the energizing circuit for the operating coil of the relay 58. Due to the slow-release characteristic of the relay 58, however, the contact member of the relay 58 remains in closed position for a certain length of time long enough for the relay 57 to be picked up.

In its picked-up position, the contact member a of the relay 57 is effective to establish a holding circuit for maintaining the coil of the relay 57 energized thereafter independently of the contact member a of either of the brake control relays 45. This holding circuit extends from the positive battery wire 19 by way of the branch wire 81, pressure switch 61, wires 82 and 83, pressure switch 59 for the front wheel truck which is in closed position because of the pressure in the brake cylinders 29, contact member a of the relay 57, wire 99, the contact member of relay 58, wire 101, coil of relay 57, and wires 98 and 85 to the negative battery wire 20.

The contact members d and e of the relay 57 are effective in the picked-up position thereof to reverse the terminal connections of the operating coil of the relay 45 for the trailing axle of the front wheel truck in its corresponding generator circuit in a manner which will be readily apparent. Accordingly, the contact members a and b of the relay 45 are immediately and positively returned to the normal position thereof due to the flow of current through the operating coil of the relay in a direction opposite to that required to pick up the relay. The opening of the contact member a of the relay 45 is ineffective to effect deenergization of the relay 57 because of the holding circuit, previously traced, which is maintained independently of the contact member a. Furthermore, due to the return of the contact member b of the relay 45 for the trailing axle of the front wheel truck to its closed position, the circuit is reestablished for energizing the operating coil of the relay 58. The contact member of the relay 58 has not had time to open as yet and thus it remains closed without interrupting the holding circuit for the operating coil of the relay 57.

It will be seen, therefore, that by reversing the terminal connections of the operating coil of the brake control relay 45 in its generator circuit, the relay is conditioned to operatively respond thereafter to a flow of current in the proper direction, which is, however, now induced or produced in response to acceleration of the vehicle wheel instead of deceleration as previously.

In a similar manner contact members b and c of the relay 57 for the front wheel truck are effective in their picked-up positions to reverse the terminal connections of the operating coil of the relay 45 corresponding to the leading axle of the front wheel truck in its corresponding generator circuit.

Contact member g of the relay 57 for the front wheel truck is effective in its picked-up position to complete a circuit for energizing the magnet winding of the magnet valve device 75 for the brake control valve mechanism 31 of the front wheel truck. This circuit extends from the positive battery wire 19 by way of the branch wire 88, a wire 105, contact member g of the relay 57, a wire 106, magnet winding of the magnet valve device 75 of the valve mechanism 31, and wire 106 to the negative battery wire 20.

As previously explained, upon energization of the magnet winding of the magnet valve device 75 of the valve mechanism 31, the supply of fluid under pressure to the relay valve portion 69 of the valve mechanism 31 is cut off and, at the same time, fluid under pressure acting on the piston of the relay valve portion is vented to atmosphere at a rapid rate. The relay valve portion 69 of the valve mechanism 31 is accordingly effective to rapidly reduce the pressure in the brake cylinders 29 for the front wheel truck to effect the release of the brakes on the front wheel truck.

Contact member f of brake relay 57 is effective, in its picked-up position, to connect the positive battery wire 19 to the indicating wire 21. This circuit extends from the positive battery wire 19 by way of wire 88, a branch wire 90, contact member f of relay 57, wire 90a, and a branch wire 100 to the indicating wire 21. With the indicating wire thus connected to the positive wire, that is energized, the indicating lamp 66 is illuminated and indicates the automatic release of the brakes.

Due to the rapid release of the fluid under pressure from the brake cylinders 29 of the front wheel truck, the slipping wheels of the trailing axle promptly cease deceleration and begin to accelerate back toward a speed corresponding to vehicle speed without reaching the locked-wheel condition.

The magnet valve 75 of the valve mechanism 31 will remain energized as long as the relay 57 is picked-up and, since the relay 57 will remain picked-up as long as the holding circuit for the operating coil of the relay 57 is maintained, it will be seen that the valve mechanism 31 continues to cause fluid under pressure to be vented from the brake cylinders 29 for the front wheel truck until the holding circuit is interrupted by the drop-out of the contact member of the relay 58 in response to the pick-up of the relay 45 for the trailing axle of the front wheel truck.

If the slipping wheels on the trailing axle of the front wheel truck begin to accelerate promptly upon the release of fluid under pressure from the brake cylinders, the relay 45 will be promptly picked-up in response to the high rate of acceleration of the slipping wheels back toward a speed corresponding to vehicle speed. The contact member of the relay 58 opens a short interval of time after the contact member b of the relay 45 is picked-up, and consequently the holding circuit for the operating coil 57 is interrupted without waiting until the pressure in the brake cylinders of the front wheel truck has reduced sufficiently to open the pressure switch 59.

If, for some reason, such as a poor adhesion condition of the rails, the slipping wheels do not accelerate back toward a speed corresponding to vehicle speed at a sufficiently rapid rate to cause pick-up of the relay 45, the holding circuit for the relay 57 will be interrupted when the pressure in the brake cylinders on the front wheel truck is reduced sufficiently to cause opening of the pressure switch 59.

Upon the interruption of the holding circuit for the operating coil of the relay 57, the contact members of the relay are promptly returned to their dropped-out positions. The return of the contact members f and g to their dropped-out positions automatically interrupts the circuits for energizing the indicating lamp 66 and the magnet valve device 75. The indicating lamp 66 is accordingly extinguished, indicating the cessation of reduction of brake cylinder pressure and, at the same time, initiation of reapplication of the brakes.

As previously explained, upon deenergization of the magnet valve 75 of the valve mechanism 31, fluid under pressure is resupplied at a restricted rate to the operating piston of the relay valve portion 69 of the valve mechanism 31, and the relay valve portion 69 correspondingly operates to restore the pressure in the brake cylinders 29 at a restricted rate. The restoration of the pressure in the brake cylinders 29 at a restricted rate minimizes the possibility of a recurrence of wheel slipping.

It should be understood that the automatic brake release and brake reapplication operation just described for the front wheel truck is not duplicated on the rear wheel truck unless a wheel and axle unit on the rear wheel truck begins to slip. Thus, although the sanding operation is effected simultaneously on all wheel trucks on a car or train, the automatic brake release to prevent wheel sliding and the reapplication of the brakes is effected on only that truck or trucks on which the wheels of one or both axles slip. It is deemed unnecessary to describe the operation for the rear wheel truck inasmuch as it is similar to that just described for the front wheel truck, and, also, because corresponding parts and wires for the two wheel trucks are designated by the same reference numerals.

As previously indicated the sanding operation continues, once it is initiated for a certain length of time which is less than the time required for the car or train to come to a complete stop. Accordingly, sanding is stopped before the car stops. Thus, when the car comes to a complete stop in response to the application of the brakes, it is not necessary for the operator to perform any act to shut off the sanding operation.

It will be understood that the operator may vary the degree of application of the brakes when the car is approaching a stop to suitably control the rate of retardation of the car. That is he may, in accordance with conventional operation, reduce the degree of application of the brakes by operation of the brake valve handle as the car approaches a stop. Similarly, after the car has come to a stop, the operator may increase the degree of application to any desired degree to hold the car against creepage, as when the car stops on a grade.

When the operator desires to again start the car, he first releases the brakes by shifting the brake valve handle 28a to its normal release position thereby reducing the pressure in the control pipe 18 to atmospheric pressure and causing all the valve mechanisms 31 to function to correspondingly vent fluid under pressure from the associated brake cylinders 29 to effect the complete release of the brakes on all wheels. When the pressure in the control pipe 18 reduces below a value, such as five pounds per square inch, corresponding to a substantially complete release of the brakes, the pressure switch 61 opens and thereby interrupts the holding circuit previously traced for the operating coil of the sanding relay 55 which accordingly is restored to its dropped-out position. The apparatus is accordingly conditioned, as originally described, with the contact members b, c, d, and e of the sanding relay 55 short-circuiting the operating coils of the brake relays 45 in the several generator circuits and, at the same time, removing the shunt connection around the operating coils of the sand control relays 44 in the respective generator circuits.

If the operator desires to cause the cars to travel in a reverse direction and operates the propulsion controller, not shown, in a manner to effect the reverse travel of the car, the directional relay 51 is energized by flow of current through its operating coil in such a direction that the contact member of the relay is actuated to its right-hand position thereby establishing a circuit for energizing the operating coil of the reversing relay 50. This circuit extends from the positive battery wire 19 by way of the branch wire 111, the contact member of the directional relay 51, wire 112, operating coil of the reversing relay 50, and wires 113 and 93 back to the negative battery wire. Thus, immediately upon the starting of the car, the reversing relay 50 is operated to its picked-up position thereby, through the contact members a to h thereof, reversing the connections of the generators 41 in their respective circuits so that the charging current to the condenser 42 is in the same direction as for the forward travel of the car and so that the discharging current flow from the condenser 42 in each of the generator circuits is the same as for forward travel of the car.

At the same time, the contact member i of the reversing relay 50 is effective to connect the wire 91 to the wire 93 which includes in series relation therein the magnet windings of the reverse sanding magnet valve 39r for both the front and rear wheel trucks. The apparatus is accordingly conditioned in accordance with the direction of travel of the car so that, upon the pick-up of the sand control relays 44, the operation is similar to that previously described for the forward travel of the car except that the sanding devices 35r are effective to cause the deposition of sand in advance of the car wheels 13.

The brake control relays 45, the brake relays 57, and the slow release relays 58 are operative for reverse travel of the car, in the same manner as previously described for the forward direction of travel of the car, to effect the release of the brakes and the subsequent reapplication thereof when a wheel on any of the wheel trucks begins to slip, and a description of such operation is accordingly deemed unnecessary.

Figure 2A:
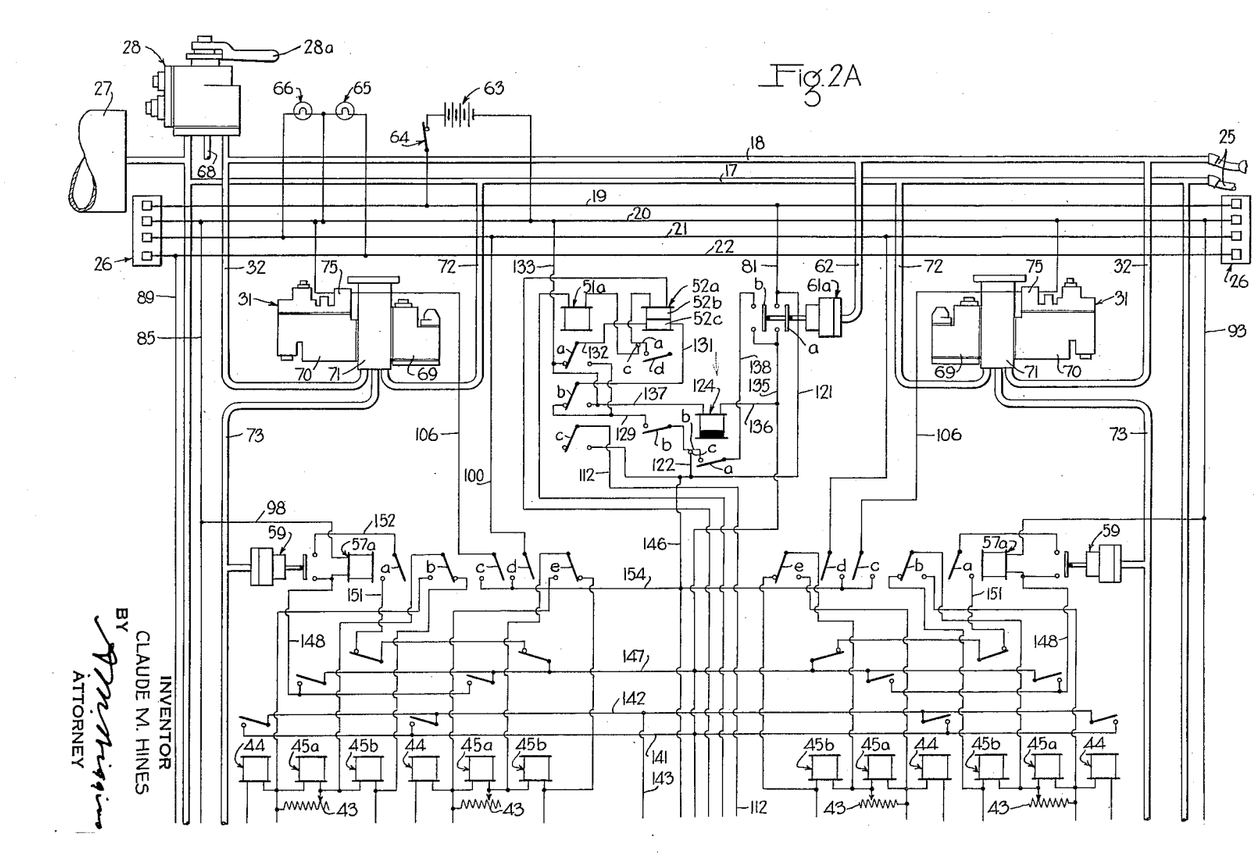
Figure 2B:
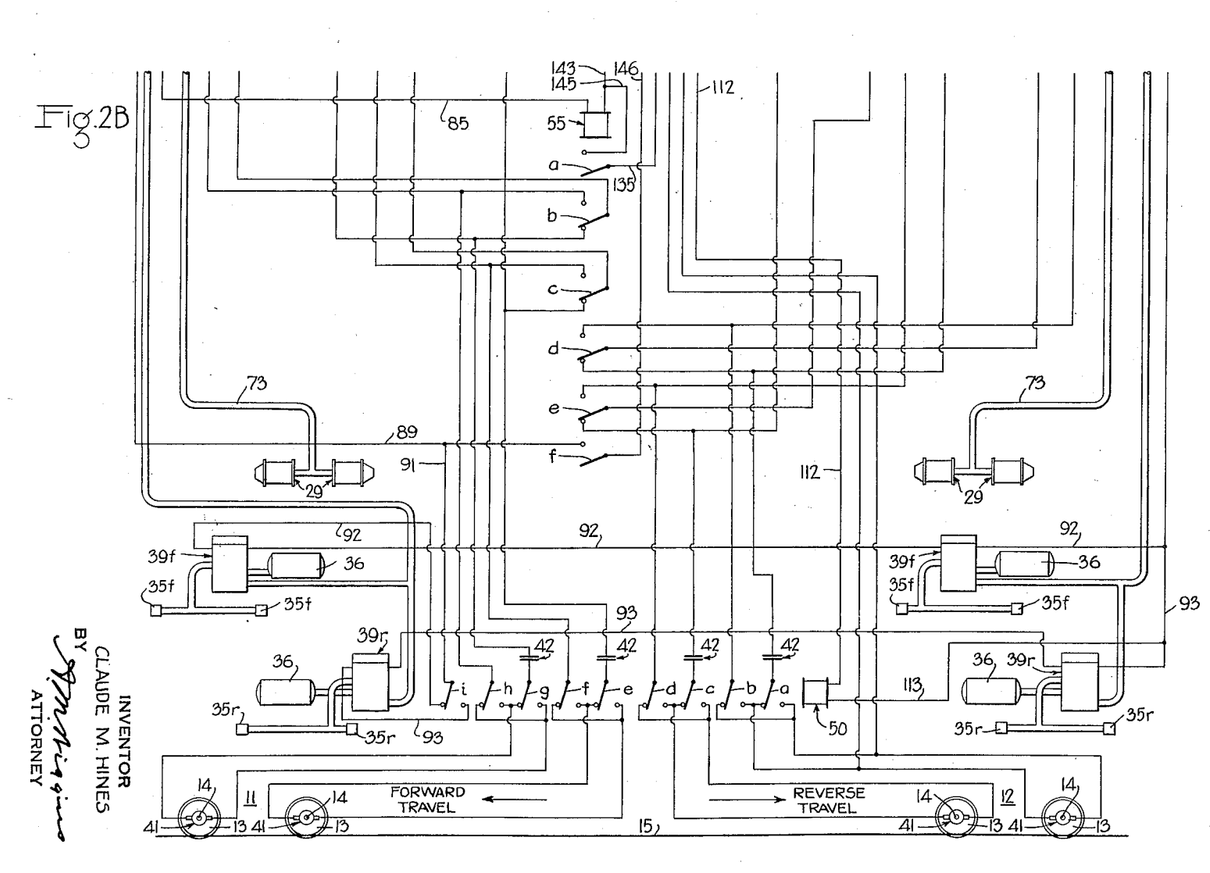

*Embodiments shown in Figures 2A and 2B*

The apparatus shown in Figs. 2A and 2B is a modification of the apparatus shown in Figs. 1B and 1A. A large part of the equipment in Figs. 2A and 2B is the same or equivalent to that disclosed in Figs. 1A and 1B, the two equipments differing only in certain respects. It is accordingly deemed sufficient to identify the corresponding parts and wires in the two equipments by the same reference numerals without further description and describe only so much of the equipment shown in Figs. 2A and 2B that distinguishes and differentiates from the equipment shown in Figs. 1A and 1B.

Essentially, the apparatus shown in Figs. 2A and 2B differs from that of the first embodiment in providing, in place of the single relay 45 of each generator circuit, two relays 45a and 45b, the relay 45a being picked-up only in response to a current flowing in the circuit in one direction and exceeding a certain value corresponding to a slipping rate of deceleration of the vehicle wheel and the relay 45b being picked-up only in response to a current flowing in the circuit in the opposite direction and exceeding a certain value corresponding to acceleration of a slipping vehicle wheel at a rate exceeding a certain rate while returning to a speed corresponding to vehicle speed. It will be apparent, therefore, that essentially the apparatus disclosed in the present embodiment differs from the first embodiment in providing two separate relays for performing the functions performed by the single relay 45 of the first embodiment.

For simplicity, only the relay 45a is shown as provided with an adjustable resistor 43 for controlling the pick-up point of the relay, it being understood that the other relays 44 and 45b may also be provided with similar adjustable shunting resistors if desired.

The apparatus shown in the present embodiment includes a slightly different arrangement than that of the first embodiment for controlling the reversing relay 50 in accordance with the direction of travel of the car or train. The type of apparatus for controlling the reversing relay 50 of the present embodiment is disclosed and claimed in my prior copending application Serial No. 299,996. Briefly it comprises, in place of the directional relay 51 and cut-off relay 52 of the first embodiment, a directional relay 51a and a cut-off relay 52a. The directional relay 51a is a polarized relay, the same as is the relay 51, and differs from the relay 51 in that it has three contact members designated respectively a, b, and c. The contact members a and b are reversing contacts, the purpose of which will be explained presently. The contact member c corresponds to the single contact member of the relay 51 and has the same function, namely to control energization and deenergization of the reversing relay 50.

The cut-out relay 52a is of the neutral type having two coils 52b and 52c which function as a pick-up coil and a holding coil respectively. The cut-out relay 52a has, in addition, a back-contact member a and a front-contact member b. The back-contact member a engages a stationary contact member c, and the front-contact member b is in open position when the two coils 52b and 52c of the relay are deenergized. When the pick-up coil 52b is energized by flow of current in either direction, the back contact member a is engaged by an arm d that moves with the front-contact member b and shifts it out of contact with the stationary contact member c. The arrangement of the contact members a and b is such that when the pick-up coil 52b is energized, the contact member b is shifted to closed position before the arm d engages the contact member a. Thus contact member b is shifted to closed position and the contact member a to open position sequentially.

The operating coil of the directional relay 51a and pick-up coil 52b of the cut-out relay 52a are connected in series relation across the brush terminals of one of the generators 41, such as the generator 41 for the trailing axle of the rear wheel truck 12. This circuit includes the switch formed by the contact members a and c of the cut-out relay 52a. The pick-up coil 52b of the cut-out relay 52a is so designed as to require a higher current to pick up its contact members than is required by the operating coil of the directional relay 51a to effect the proper positioning of the contact members a, b, and c in accordance with the polarity at the brush terminals of the axle-driven generator 41 and, therefore, in accordance with the direction of travel of the car.

When the car starts to move, therefore, the initial flow of current through the operating coil of the directional relay 51a in the direction corresponding to the travel of the car causes the contact members a, b, and c of the relay 51a to be correspondingly positioned. As shown, it is assumed that for the forward direction of travel the direction of flow of current through the operating coil of the directional relay 51a is such as to maintain the contact members a, b, and c in the position shown. It is further assumed that when the direction of flow of current to the operating coil 51a is reversed in accordance with the reverse travel of the car, the contact members a, b, and c are shifted in the right-hand direction to the position opposite to that shown. Like the relay 51, the relay 51a is of such nature that once the contact members a, b, and c are actuated to a given position, they remain in such position thereafter until the current through the operating coil of the relay is reversed.

As the speed of rotation of the vehicle wheels increases further so that the voltage at the brush terminals of the generator 41 correspondingly increases to supply a higher energizing current, the pick-up coil 52b is responsively energized to cause sequential operation of the front contact member b to its closed position and operation of the back contact member a to its open position. With the contact member b of the cut-out relay 52a in its closed position, a circuit is established for energizing the holding coil 52c of the cut-out relay 52a. This circuit extends from the positive battery wire 19 by way of the branch wire 81, a branch wire 121, a wire 122, a contact member b of a relay 124 presently to be described, contact member b of the cut-out relay 52a, a wire 129, contact member b of the directional relay 51a, a wire 131, holding coil 52c of the cut-out relay 52a, a wire 132, contact member a of the directional relay 51a and a wire 133 back to the negative battery wire 20. As long as this holding circuit remains intact, the holding coil 52c remains energized to hold the cut-out relay 52a in its picked-up position.

In the picked-up position of the cut-out relay 52a, the back-contact member a thereof is opened and therefore interrupts the energizing circuit of the operating coil of the directional relay 51a and the pick-up coil 52b of the cut-out relay 52a. It will be observed that the arrangement is such as to establish the energizing circuit for the holding coil 52c before the circuit for the pick-up coil 52c is interrupted, thus preventing the drop-out of the cut-out relay 52a.

The holding circuit for energizing the holding coil 52c of the cut-out relay 52a is interrupted, to permit the directional relay 51a to thereafter be operative in accordance with the direction of travel of the car, by means of the relay 124 and a pressure switch 61a which corresponds to the pressure switch 61 of the first embodiment and differs therefrom in having two separate insulated contact members a and b instead of but one contact member. As in the first embodiment, the pressure switch 61a of the present embodiment is connected to the control pipe 18 by a branch pipe 62 and the two contact members a and b are both actuated from closed to open position when the pressure in the control pipe 18 reduces below the predetermined low pressure of five pounds per square inch.

The relay 124 is a conventional type slow-release or slow drop-out type having a front-contact a and a back-contact b. When the operating coil of the relay 124 is deenergized, the front-contact a disengages the back-contact member b, while the back-contact member b engages a stationary contact member c, thereby establishing the holding circuit, previously described, for the holding coil 52c of the cut-out relay. When the operating coil of the relay 124 is energized, the front-contact member a is picked-up to engage the back-contact member b and at the same time shift it out of engagement with the stationary contact member c.

The operating coil of the relay 124 is energized upon the closure of the contact member a of the pressure switch 61a by a circuit which extends from the positive battery wire 19 by way of the wire 81, contact member a of the pressure switch 61a, a wire 135, branch wire 136, coil of relay 124, a wire 137, and wire 133 to the negative battery wire 20.

With the front contact a of the relay 124 picked-up, a second holding circuit is established for holding coil 52c of the cut-out relay 52a. This second holding circuit extends from the positive battery wire 19 by way of the wire 81, contact members a and b of the pressure switch 61a in series, a wire 138, contact members a and b of the relay 124 now in engagement, contact member b of the cut-out relay 52a, and then as previously traced for the first holding circuit through the holding coil 52c to the negative battery wire 20.

It will accordingly be seen that when the pressure switch 61a is operated to closed position in response to an application of the brakes, the control of the holding coil 52c of the cut-out relay 52a is transferred to a holding circuit which is subject to the pressure switch 61a. Thus, when the brakes are subsequently released and the pressure switch 61a correspondingly operated to open position, the holding circuit for coil 52c is interrupted and the contact members a and b of cut-out relay 52a are restored to their normal positions, in which the contact member a is effective to reconnect the operating coil of the directional relay 51a and the pick-up coil 52b of the cut-out relay 52a across the brush terminals of the generator 41 and the contact member b is in open position to interrupt the circuit of the holding coil 52c.

The contact member b of the pressure switch 61a is provided in order to prevent a pumping operation of the relay 124 as explained in my prior copending application Serial No. 299,996.

It is necessary to reverse the flow of current to the holding coil 52c of the cut-out relay 52a in accordance with the reversal of current in the pick-up coil 52c to prevent bucking of the magnetic flux set up by the two coils resulting in undesired dropping-out of the relay. The reversing contact members a and b of the directional relay 51a function for this purpose.

The relay 124 is of the slow-release type in order to insure the opening of the contact member b of the cut-out relay 52a before the contact member a of the relay 124 shifts to its dropped-out or normal position in response to the opening of the contact members a of the pressure switch 61a, thereby preventing establishment of the first holding circuit for the holding coil 52c of cut-out relay 52a.

The present embodiment differs further from the first embodiment in having a modified form of brake control relay 57a, in place of the brake control relay 57 of the first embodiment, for each wheel truck. The relays 57a are of the neutral type having suitable operating coils and a plurality of contact members a, b, c, d, and e. The arrangement of the contact members of the relays 57a and the function thereof differ somewhat from that of the relay 57 of the first embodiment and these functions will be explained hereinafter in connection with an assumed operation.

The present embodiment includes a sanding relay 55 which corresponds identically in structure to the relay 55 of the first embodiment and which has its operating coil controlled in the same manner as in the first embodiment by the parallel-related sand control relays 44.

The contact members a and f of the sanding relay 55 of the present embodiment perform the same function as in the first embodiment. The contact members b, c, d, and e of the relay 55 of the present embodiment, however, are each effective in the dropped-out position thereof to short-circuit the operating coils of the two relays 45a and 45b in the respective generator circuits and are effective in their picked-up or raised position to remove such short-circuit connection and establish a short-circuit connection around the operating coil of the relays 44 in the corresponding circuits.

*Operation of embodiment shown in Figures 2A and 2B*

Let it be assumed that the car is traveling along the road under power in a forward direction with the brakes released. In such case, therefore, the reversing relay 50 will be in the dropped-out position shown in Fig. 2B because the contact member c of the directional relay 51a will be in its open position shown in Fig. 2A. At the same time, the holding coil 52c of the cut-out relay 52a will be energized over the first holding circuit described above, so that the operating coil of the directional relay 51a and the pick-up coil 52b of the cut-out relay 52a will be disconnected from the brush terminals of the corresponding generator 41.

Under the assumed conditions, therefore, the various other relays and control mechanism will be conditioned as shown in the drawings.

Let it now be further assumed that the operator cuts off the propulsion power and effects an application of the brakes in the manner described in the first embodiment. When the rate of rotative deceleration of the vehicle wheels 13 attains a certain value, with or without slipping of the wheels, the current discharging from the condensers 42 in the respective generator circuits flows through the operating coil of the corresponding sand control relay 44 in the proper direction to cause pick-up of the relay.

Upon the pick-up of one or more of the relays 44, a circuit is completed for energizing the coil of the sanding relay 55. This circuit extends from the positive battery wire 19, by way of the wire 81, contact member a of the pressure switch 61a, wire 135, a bus wire 141, in parallel through one or more of the contact members of the several relays 44, a bus wire 142, a branch wire 143, coil of the relay 55, and wire 85 back to the negative battery wire 20.

The contact member a of the relay 55 is effective in its picked-up position to establish a holding circuit for maintaining the coil of the relay 55 energized thereafter independently of the contact members of the relays 44. This holding circuit extends from the positive battery wire 19 by way of the wire 81, contact member a of pressure switch 61a, wire 135, contact member a of the relay 55, a wire 145, wire 143, coil of relay 55, and wire 85 back to the negative battery wire 20. Relay 55 accordingly remains picked-up thereafter independently of the relays 44 until the contact member a of the pressure switch 61a opens.

The contact member f of the sanding relay 55 is effective in its picked-up position to establish a circuit for energizing the sand control magnet valves 39f. This circuit extends from the positive battery wire 19 by way of the wires 81 and 121, a branch wire 146, contact member f of the relay 55, wire 89, branch wire 91, contact member i of the reversing relay 50, wire 92 including the magnet windings of the magnet valve devices 39f for the front and rear wheel trucks 11 and 12 in series relation, and wire 93 back to the negative battery wire 20.

The magnet valve devices 39f are accordingly operated to supply fluid under pressure from their respective sanding reservoirs 36 to the sanding devices 35f to cause sanding in advance of the wheels 13 of both wheel trucks. At the same time, the contact member f of the sanding relay 55 is effective while in its picked-up position to energize the sanding wire 22 due to the fact that the wire 89 is connected to the sanding wire. Thus, in the case of a train of cars, sanding is initiated simultaneously on all cars notwithstanding the fact that the sanding relay 55 on different cars may not be picked up, which might be the case where an individual wheel and axle unit on one car begins to slip while the wheel and axle unit on other cars do not slip. In such case, the magnet valves 39f are energized by a circuit which extends from the positive battery wire 19 to the sanding wire 22, then by way of the wires 89 and 91, through the windings of the sanding magnet valves 39f and back to the negative battery wire 20 by the wire 93.

It will be understood, of course, that if all the wheels on a car or train are decelerating at a uniform rate, without slipping of any of the wheels, sanding will be effected on each car, either by operation of the sanding relay 55 on the car or by energization of the train sanding wire 22, whichever occurs first.

As in the first embodiment, the sanding will continue for a limited time until the fluid under pressure in the sanding reservoirs 36 is exhausted through the sanding devices 35f, which limited time is less than that required for the train to come to a complete stop.

The contact members b, c, d, and e of the sanding relay 55 are effective in their picked-up positions to interrupt the short-circuit connection around the series-connected operating coils of the relays 45a and 45b and, at the same time, establish a short-circuit connection around the operating coil of each of the sand control relays 44 in the several generator circuits.

The removal of the short-circuit connection around the operating coils of the relays 45a and 45b, as just described, is not effective however to remove another short-circuit connection around the operating coil of each of the relays 45b, which connections are established respectively by the contact members b and e of the brake relay 57a.

It will thus be seen that when the sanding relay 55 is picked-up, the sand control relays 44 are cut out of the respective generator circuit and the brake control relays 45a are cut into their respective generator circuits.

Now let it be assumed that due to the application of the brakes and notwithstanding the sanding operation, an individual wheel and axle unit, such as the trailing axle unit of the front wheel truck 11 begins to slip. In such case, therefore, the current discharged from the corresponding condenser 42 through the operating coil of the corresponding relay 45a is effective to cause pick-up of the contact member thereof. The contact member of the relay 45a corresponding to the slipping wheel and axle unit is effective in its picked-up position to establish a circuit for energizing the operating coil of the brake relay 57a of the front wheel truck. This circuit extends from the positive battery wire 19 by way of the wire 81, contact member a of pressure switch 61a, wire 135, a bus wire 147, the contact member of the brake control relay 45a corresponding to the slipping wheel and axle unit, a wire 148, coil of relay 57a, and wires 98 and 85 back to the negative battery wire 20.

The contact member a of the brake relay 57a is effective in its picked-up position to establish a holding circuit for the coil of the relay 57a which is independent of the relays 45a. This circuit extends from the positive battery wire 19 to the bus wire 147 as previously traced, then in series relation through the closed back-contact members of the two relays 45b for the front wheel truck, a wire 151, contact member a of the relay 57a, a wire 152, pressure switch 59 (now closed) for the front wheel truck, wire 148, coil of relay 57a, and wires 98 and 85 to the negative battery wire 20.

The contact members b and e of the relay 57a of the front wheel truck are respectively effective in their picked-up positions to interrupt the short-circuit connection around the operating coils of the relays 45b for the leading and trailing wheel and axle unit of the front wheel truck and, at the same time, to establish a short-circuit connection around the operating coils of relays 45a in the corresponding generator circuits. Thus, when the relay 57a is picked-up, the relays 45a are shunted out of their respective generator circuits and the relays 45b are cut in to their respective generator circuits.

The contact member c of the relay 57a for the front wheel truck is effective in its picked-up position to establish a circuit for energizing the magnet winding of the magnet valve device 75 of the valve mechanism 31 for the front wheel truck. This circuit extends from the positive battery wire 19 by way of the wires 81, 121, and 146 to a bus wire 154, then by way of the contact member c of relay 57a and the wire 106 including the magnet winding of the magnet valve device 75, back to the negative battery wire 20.

The valve mechanism 31 is accordingly operated to cut off the supply of fluid under pressure to the brake cylinders 29 of the front wheel truck and rapidly vent fluid under pressure therefrom to effect a rapid release of the brakes.

The contact member d of the relay 57a is effective in its picked-up position to energize the indicating wire 21 and cause illumination of the indicating lamp 66, thus giving the operator visual indication of the automatic release of the brakes on the front wheel truck. The circuit for energizing the indicating wire 21 extends from the positive battery wire 19 to the bus wire 154 as previously traced and then by way of the contact member d of the relay 57a and wire 109 to the indicating wire 21.

Due to the rapid release of the brakes on the front wheel truck, the slipping wheels of the trailing axle promptly cease to decelerate and begin to accelerate back toward a speed corresponding to vehicle speed without attaining a locked-wheel condition and sliding. When the rate of rotative acceleration of the slipping wheels is sufficient to cause pick-up of the corresponding relay 45b, the back-contact member of that relay is shifted to open position thereby interrupting the holding circuit, previously traced, for maintaining the operating coil of the brake relay 57a energized, so that the relay is accordingly dropped-out.

Upon the drop-out of the relay 57a, the contact members c and d thereof respectively interrupt the circuit for energizing the magnet winding of the magnet valve device 75 of the valve mechanism 31 and the circuit for energizing the indicating wire 21. The valve mechanism 31 is accordingly effective to cause fluid under pressure to be resupplied to the brake cylinders 29 of the front wheel truck at a restricted rate and, at the same time, the indicating lamp 66 is extinguished to indicate to the operator the cessation of reduction of brake cylinder pressure and the reapplication of the brakes.

The contact members b and e of the relay 57a are respectively effective in their dropped-out positions to reestablish the short-circuit connection around the operating coils of the brake control relays 45b in the generator circuits for the front wheel truck and, at the same time, remove the short-circuit connection around the operating coil of each of the brake control relays 45a.

It will thus be apparent that, unless a wheel on the front wheel truck again begins to slip, the relay 57a remains dropped-out thereafter with the result that the pressure in the brake cylinders 29 is built up at the restricted rate uninterruptedly. It will be observed also that only one of the relays 44, 45a or 45b is connected effectively in the corresponding generator circuit at any one time.

If upon the reapplication of the brakes resulting from drop-out of brake relay 57a, the wheels on either axle of the front wheel truck should again begin to slip, the automatic brake release and reapplication operation just described is repeated.

If for some reason, such as poor adhesion between the wheels and rails, a slipping wheel does not accelerate at a sufficiently rapid rate back toward a speed corresponding to vehicle speed to cause pick-up of the relay 45b corresponding thereto, the automatic reduction of the pressure in the front wheel truck brake cylinders 29 continues until such time as the pressure switch 59 opens in response to reduction of the pressure in the brake cylinders to below a certain low value, such as ten pounds per square inch. The opening of the pressure switch 59 interrupts the holding circuit for the relay 57a, just as does the pick-up of the relay 45b, so that the reapplication of the brakes and the extinguishing of the indicating lamp 66 is similarly effected.

It will be observed, however, that as in the first embodiment, the apparatus of the present embodiment is so designed as to effect only so much of a reduction in brake cylinder pressure as is required to cause the slipping wheels to return to a speed corresponding to vehicle speed without waiting arbitrarily until a predetermined reduction of brake cylinder pressure is effected. The provision of the pressure switch 59 in the holding circuit of the brake relay 57a is, however, a back-up or safety feature which insures reapplication of the brakes in the event of failure of the relays 45b to effect reapplication previously.

The operation described above will be the same with respect to any of the wheel and axle units on either of the wheel trucks and it is believed that such operation will be apparent from the previous description without a specific description thereof.

When the car or train comes to a complete stop, the sanding operation has of course been automatically cut off so that the operator merely allows the brake valve handle 28a to remain in a position to effect a sufficient degree of application of the brakes to hold the car or train against creepage.

When the operator returns the brake valve handle 28a to release position prior to again starting the car, the resultant opening of pressure switch 61a interrupts the holding circuit for the holding coil 52c of the cut-out relay 52a, thereby reconnecting the operating coil of the directional relay 51a across the brush terminals of the corresponding generator 41 in readiness for operation in accordance with the subsequent direction of travel.

If the operator starts the car in a reverse direction, the directional relay 51a is operated to the position opposite that in which it is shown. Contact member c of the directional relay 51a is accordingly effective to complete the energizing circuit for the operating coil of the reversing relay 50 in exactly the same manner as in the first embodiment. Contact members a and b of the directional relay 51a are effective to reverse the connections of the holding coil 52c in the holding circuit for reasons previously explained.

The operation of the equipment for the reverse travel of the car or train is exactly the same as that for the forward travel except that the sanding magnet valves 39r are energized so that the sanding devices 35r are effective to cause deposition of sand in advance of the vehicle wheels. In view of the previous description of the sanding operation in this embodiment, as well as the description of the sanding operation in the first embodiment, it is believed unnecessary to further describe the sanding operation for the reverse travel of the car or train in this embodiment.

*Summary*

Summarizing, it will be seen that I have disclosed two embodiments of a brake and sanding control equipment for a car or train of cars. In both embodiments each axle of the car or train drives a generator of the direct current type which generates a voltage proportional to the speed of rotation of the axle and wheels fixed thereto. In the first embodiment, two current-responsive relays and an electrical condenser are connected in series relation across the brush terminals of the generator for each axle. When the rate of rotative retardation of the car wheel and axle unit exceeds a certain value, the current discharged from the condenser, which current is proportional in value to the rate of retardation of the axle and wheels, causes one of the relays to pick up and initiate a sanding operation on all trucks of a car or train. This sanding operation continues for a certain limited time and is then automatically cut off.

In the first embodiment, if a wheel slips, the second relay in the generator circuit is initially responsive to the current discharged from the condenser, and proportional to the higher rate of deceleration of the vehicle wheel while slipping, to initiate the release of the brakes on the particular truck having the slipping wheel. Upon the pick-up of the second relay, another relay reverses the connection of the relay in the generator circuit so that the relay is thereafter responsive only to a condenser charging current exceeding a value corresponding to a certain rate of acceleration of the vehicle wheel. When the second relay of the generator circuit is again picked-up in response to acceleration of the wheel back toward a speed corresponding to car speed, the release of the brakes is terminated and reapplication of the brakes is initiated. If the wheels fail to accelerate at a sufficient rate back toward a speed corresponding to car speed to cause pick-up of the second relay, a pressure switch responsive to reduction of brake cylinder pressure below a certain low pressure is effective to cause termination of the brake release and initiation of the reapplication.

In the second embodiment, three current-responsive relays and an electrical condenser are connected in series relation across the brush terminals of each axle-driven generator. One of the relays is responsive to a certain condenser discharge current corresponding to a certain rate of retardation of a wheel for initiating sanding, as in the first embodiment. The second relay is responsive to a higher condenser discharge current, corresponding to a slipping rate of deceleration of the wheel, to initiate a brake release on the wheel truck having the slipping wheel. The third relay is responsive to a condenser charging current, corresponding to at least a certain rate of acceleration of the slipping wheel back toward a speed corresponding to car speed, to terminate the release of the brakes and initiate reapplication thereof.

In both embodiments, the arrangement of the relays in the generator circuit for each axle on a car or train is such that all of the relays, except that particular one immediately required, are shunted out of the circuit, each relay being cut into the circuit at the desired time. This particular feature disclosed is not a part of my present invention.

In both of the embodiments, electrical apparatus is provided which automatically conditions the circuits associated with each axle-driven generator to cause the proper operation of the sand control and brake control relays notwithstanding a reversal of direction of travel of the car or train.

While I have disclosed and described only two embodiments of my invention, it will be understood that various omissions, additions, or modifications may be made in the apparatus shown without departing from the spirit of my invention. It is accordingly not my intention to limit the scope of my invention except as it is necessitated by the scope of the prior art.

Having now described my invention, what I claim as new and desire to secure by Letters Patent, is:

1. A brake control system for a wheeled vehicle comprising, in combination, means for effecting an application of the brakes associated with the vehicle wheels, means for producing an electrical effect substantially proportional in degree to the rate of rotative deceleration and acceleration of a vehicle wheel, and means operative during an application of the brakes in response to an electrical effect in excess of a certain degree, occurring when the said wheel rotatively decelerates while slipping, to initiate the release of the brakes associated with said wheel and operative thereafter in response to an electrical effect in excess of a certain degree, occurring while the slipping wheel accelerates back toward a speed corresponding to vehicle speed, for terminating the release of the brakes associated with said wheel and for initiating reapplication of the brakes.

2. A brake control system for a wheeled vehicle comprising, in combination, a brake cylinder adapted to apply the brakes associated with a vehicle wheel upon the supply of fluid under pressure thereto and to effect the release of the brakes upon the release of fluid under pressure therefrom, manually operated means for causing fluid under pressure to be supplied to and released from the brake cylinder to control the application and release of the brakes, means adapted to produce an electrical effect substantially proportional in degree to the rate of rotative deceleration and acceleration of the vehicle wheel, and means operative during an application of the brakes in response to an electrical effect in excess of a certain degree, occurring when the said vehicle wheel rotatively decelerates while slipping, to initiate a release of fluid under pressure from said brake cylinder and operative thereafter in response to an electrical effect in excess of a certain degree, occurring while the slipping wheel accelerates back toward a speed corresponding to vehicle speed, for terminating the release of fluid under pressure from the brake cylinder and initiating a resupply of fluid under pressure thereto.

3. A brake control system for a wheeled vehicle comprising, in combination, means for effecting an application of the brakes associated with the vehicle wheels, an electrical circuit, means for producing a flow of current in said circuit substantially proportional to the rate of rotative deceleration and acceleration of a vehicle wheel, and current-responsive means in said circuit operative during an application of the brakes in response to a current in excess of a certain value, occurring in said circuit when the said vehicle wheel rotatively decelerates while slipping, to initiate a release of the brakes associated with said wheel and operative thereafter in response to a current in excess of a certain value, set up in the circuit while the slipping wheel accelerates back toward a speed corresponding to vehicle speed, for terminating the release of the brakes associated with said wheel and initiating reapplication thereof.

4. A brake control system for a wheeled vehicle comprising, in combination, a brake cylinder adapted to apply the brakes associated with a vehicle wheel in accordance with the pressure of fluid supplied thereto and, upon the release of fluid under pressure therefrom, to effect release of the brakes, manually operative means for controlling the supply and release of fluid under pressure to and from the brake cylinder to control the application and release of the brakes, an electrical circuit, means for causing a flow of current in said circuit substantially proportional to the rate of rotative deceleration and acceleration of a vehicle wheel, and means operative during an application of the brakes in response to a current in excess of a certain value, occuring in said circuit when the said vehicle wheel rotatively decelerates while slipping, to initiate a release of the brakes associated with said wheel and operative thereafter in response to a current in excess of a certain value, occurring in said circuit while the slipping wheel accelerates back toward a speed corresponding to vehicle speed, for terminating the release of fluid under pressure from the brake cylinder and initiating the resupply of fluid under pressure thereto.

5. A brake and sanding control system for a wheeled vehicle comprising, in combination, means for effecting application and release of the brakes associated with the vehicle wheels, sanding means, means for producing an electrical effect substantially proportional in degree to the rate of deceleration and acceleration of a vehicle wheel, means operative during an application of the brakes in response to an electrical effect in excess of a certain degree, occurring while the vehicle wheel is decelerating, to initiate operation of said sanding means, and means operative in response to an electrical effect in excess of a second certain degree higher than the said certain degree of electrical effect, occurring when the vehicle wheel is decelerating while slipping, to initiate a release of the brakes associated with said wheel and operative thereafter in response to an electrical effect in excess of a certain degree, occurring while the slipping wheel is accelerating back toward a speed corresponding to vehicle speed, for terminating the release of the brakes and initiating reapplication thereof.

6. Vehicle brake and sanding control apparatus comprising, in combination, a brake cylinder adapted to apply the brakes associated with the vehicle wheel in accordance with the pressure of an operating fluid and to effect the release of the brakes upon the release of fluid under pressure therefrom, manually operative means for causing fluid under pressure to be supplied to and released from the brake cylinder, sanding means, means for producing an electrical effect corresponding in degree to the rate of rotative deceleration and acceleration of a vehicle wheel, means operative during an application of the brakes in response to an electrical effect in excess of a certain degree, occurring when the vehicle wheel decelerates for initiating operation of said sanding means, and means operative in response to an electrical effect in excess of a second certain degree higher than said certain degree, occurring when said vehicle wheel decelerates while slipping, to initiate a reduction of pressure in the brake cylinder and operative thereafter in response to an electrical effect in excess of a certain degree occurring while the slipping wheel accelerates back toward a speed corresponding to vehicle speed as a result of the reduction of the brake cylinder pressure, for terminating the reduction of pressure in the brake cylinder and initiating a resupply of fluid under pressure thereto.

7. Vehicle brake and sanding control apparatus, comprising, in combination, means for effecting application and release of the brakes associated with the vehicle wheels, sanding means, an electrical circuit, means for producing a flow of current in said circuit corresponding in degree to the rate of rotative deceleration and acceleration of a vehicle wheel, current-responsive means in said circuit operative during an application of the brakes in response to a current in excess of a certain value, occurring when the said vehicle wheel decelerates, for initiating operation of said sanding means, and additional current responsive means in said circuit operative in response to a current in excess of a second certain value higher than said certain value, occurring when said wheel decelerates while slipping, to initiate a release of the brakes and operative thereafter in response to a current in excess of a certain value, occurring in said circuit while the slipping wheel accelerates back toward a speed corresponding to vehicle speed, for terminating the release of the brakes and initiating a reapplication thereof.

8. Vehicle brake and sanding control apparatus, comprising, in combination, a brake cylinder effective to apply the brakes associated with a vehicle wheel in accordance with the pressure of fluid supplied thereto and, upon the release of fluid under pressure therefrom, to effect the release of the brakes, manually operative means to cause fluid under pressure to be supplied to and released from the brake cylinder, sanding means, an electrical circuit, means for causing current to flow in said circuit corresponding in degree to the rate of rotative deceleration and acceleration of a vehicle wheel, current-responsive means in said circuit operative during an application of the brakes in response to a current in excess of a certain value, occurring in said circuit when the said vehicle wheel decelerates, for initiating operation of said sanding means, and additional current-responsive means in said circuit operative in response to a current in excess of a second certain value higher than said certain value, occurring when the said vehicle wheel rotatively decelerates while slipping, to initiate a reduction of pressure in the brake cylinder and operative thereafter in response to a current in excess of a certain value, occurring in said circuit while the slipping wheel accelerates back toward a speed corresponding to vehicle speed as a result of the reduction in brake cylinder pressure, for terminating the reduction of pressure in the brake cylinder and initiating a resupply of fluid under pressure thereto.

9. Vehicle brake control apparatus for a wheeled vehicle comprising, in combination, means for effecting application and release of the brakes associated with the vehicle wheels, means operative during an application of the brakes in response to rotative deceleration of a vehicle wheel at a rate in excess of a certain rate for initiating a release of the brakes associated with said vehicle wheel, means operative thereafter in response to the rotative acceleration of the vehicle wheel at a rate exceeding a certain rate for terminating the release of the brakes and initiating a reapplication thereof, and means effective, in the event that the last said means does not previously operate, to terminate the release of the brakes and initiate the reapplication thereof when the degree of application of the brakes is reduced below a certain degree.

10. Vehicle brake control apparatus for a wheeled vehicle comprising, in combination, a brake cylinder adapted to effect application of the brakes associated with a vehicle wheel in accordance with the pressure of the fluid supplied thereto and adapted to effect the release of the brakes upon the release of fluid under pressure therefrom, manually operative means for causing fluid under pressure to be supplied to and released from the brake cylinder, means operative in response to the rotative deceleration of the vehicle wheel at a rate exceeding a certain rate while slipping for causing a reduction of the pressure in the brake cylinder, means operative thereafter in response to the rotative acceleration of the slipping wheel back toward a speed corresponding to vehicle speed at a rate exceeding a certain rate for terminating the reduction of pressure in the brake cylinder and initiating a resupply of fluid under pressure thereto, and pressure responsive means effective in the event of failure of the last said means to terminate the reduction of brake cylinder pressure, for terminating the reduction of brake cylinder and initiating a resupply of fluid under pressure thereto when the pressure in the brake cylinder reduces below a certain low value.

11. Brake control apparatus for a wheeled vehicle comprising, in combination, means for effecting application and release of the brakes associated with the vehicle wheels, an electrical circuit, means for causing current to flow in said circuit proportional to the rate of rotative deceleration or acceleration of a vehicle wheel but in opposite directions depending upon whether the wheel is decelerating or accelerating, a relay in said circuit adapted to be picked-up only when energized by a current in excess of a certain value and flowing in said one certain direction, reversing switch means for reversing the connections of the relay coil in said circuit to cause flow of current through the relay in the said one certain direction during deceleration of the vehicle wheel and also in said one certain direction during acceleration of the vehicle wheel, and means responsive to the pick-up of said relay during an application of the brakes while the vehicle wheel is decelerating for effecting a release of the brakes associated with the vehicle wheel and operative thereafter in response to the pick-up of the relay when the vehicle wheel is accelerating for terminating the release of the brakes and initiating reapplication thereof.

12. Brake control apparatus for a wheeled vehicle comprising, in combination, means for effecting application and release of the brakes associated with the vehicle wheels, an electrical circuit, means for causing a current to flow in said circuit proportional to the rate of rotative deceleration or acceleration of a vehicle wheel but in opposite directions depending upon whether the wheel is decelerating or accelerating, current-responsive means in said circuit operatively responsive to a current in one certain direction only and exceeding a certain value, switch means operative in response to the operation of said current-responsive means during deceleration of the vehicle wheel for reversing the connections of the current-responsive means in said circuit to render said current-responsive means thereafter responsive to current in said one certain direction produced during subsequent acceleration of said vehicle wheel, and means effective upon operation of said current-responsive means during deceleration of the said vehicle wheel for initiating a release of the brakes associated with said wheel and operative in response to the operation of the current-responsive means during acceleration of the vehicle wheel for terminating the release of the brakes and initiating reapplication thereof.

13. Brake control apparatus for a wheeled vehicle comprising, in combination, means for effecting application and release of the brakes associated with the vehicle wheels, means including electroresponsive means effective upon energization of the electroresponsive means during application of the brakes for effecting a release of the brakes associated with a vehicle wheel and upon deenergization of said electroresponsive means to terminate the release and initiate the reapplication of the brakes associated with the said vehicle wheel, means operative in response to the rotative deceleration of the said vehicle wheel at a rate exceeding a certain rate for effecting energization of said electroresponsive means, means effective once said electroresponsive means is energized for establishing a holding circuit to maintain said electroresponsive means energized thereafter independently of the last said means, and means responsive to the rotative acceleration of the vehicle wheel at a rate exceeding a certain rate for interrupting said holding circuit to effect deenergization of said electroresponsive means.

14. Brake control apparatus for a wheeled vehicle comprising, in combination, means for effecting application and release of the brakes associated with the vehicle wheels, means including an electric relay effective upon energization of said relay during an application of the brakes to effect the release of the brakes associated with a vehicle wheel and upon deenergization of said relay to terminate the release of the brakes associated with the vehicle wheel and initiate reapplication thereof, means operative in response to rotative deceleration of the said vehicle wheel at a rate exceeding a certain rate for effecting energization of said relay, means effective once said relay is energized for establishing a holding circuit to maintain it energized thereafter independently of the last said means, switch means operative to interrupt said holding circuit when the degree of application of the brakes associated with said wheel reduces below a certain value, and means operative in response to the rotative acceleration of the said vehicle wheel at a rate exceeding a certain rate for also interrupting said holding circuit, one or the other of said last two means being effective to interrupt the holding circuit depending upon which operates first.

15. Brake control apparatus for a wheeled vehicle comprising, in combination, means for effecting application and release of the brakes associated with the vehicle wheels, an electrical circuit, means for causing a current to flow in said circuit substantially proportional to the rate of change of rotative speed of a vehicle wheel, current-responsive means in said circuit operative in response to a current exceeding a certain value, an adjustable resistor in shunt relation to said current-responsive means adapted to vary the current through the current-responsive means for a given rate of change of rotative speed of the vehicle wheel, and means controlled by said current-responsive means for controlling individually the brakes associated with the said vehicle wheel during application of the vehicle brakes effected by the first said means.

16. Brake control apparatus for a wheeled vehicle comprising, in combination, means for effecting application and release of the brakes associated with the vehicle wheels, electrical means effective upon energization to effect the release of the brakes associated with a vehicle wheel and upon deenergization to terminate the release and initiate reapplication of the brakes associated with the said vehicle wheel, an electric circuit, means for causing a current to flow in said circuit proportional to the rate of rotative deceleration or acceleration of the vehicle wheel but in opposite directions depending upon whether the vehicle wheel is decelerating or accelerating, two electric relays having operating coils connected in series relation in said circuit, one of said relays being operatively responsive only to a current exceeding a certain value and in one certain direction corresponding to rotative deceleration of the vehicle wheel for effecting energization of said electrical means, means effective upon operation of said one relay to establish a holding circuit for maintaining the said electrical means energized thereafter independently of said one relay, and the other of said two relays in said circuit being operatively responsive only to a current exceeding a certain value and in the opposite direction corresponding to rotative acceleration of the vehicle wheel for interrupting said holding circuit.

17. Brake and sanding control apparatus for a wheeled vehicle comprising, in combination, means for effecting application and release of the brakes associated with the vehicle wheels, sanding means, an electric circuit, means for causing current substantially proportional to the rate of rotative deceleration and acceleration of a vehicle wheel to flow in said circuit but in opposite directions depending upon whether the wheel is rotatively decelerating or accelerating, three relays having operating coils connected in series relation in said circuit, one of said three relays being operatively responsive only to a current in one certain direction and in excess of a certain value corresponding to rotative deceleration of the vehicle wheels at a rate exceeding a certain rate to initiate operation of said sanding means, the second of said relays being operatively responsive only to a current exceeding a second certain value higher than the first said certain value and in said one certain direction for initiating a release of the brakes associated with the vehicle wheel, and the third of said relays being operatively responsive only to a current exceeding a certain value and in a direction opposite to said one certain direction corresponding to the rotative acceleration of the vehicle wheel at a rate exceeding a certain rate for terminating the release and initiating reapplication of the brakes associated with the vehicle wheel.

18. Brake control apparatus for a wheeled vehicle comprising, in combination, means for causing application and release of the brakes associated with the vehicle wheels, an electrical circuit, means for producing a flow of current in said circuit substantially proportional to the rate of rotative deceleration or acceleration of a vehicle wheel, the direction of flow of current in the circuit being in opposite directions for deceleration and in opposite directions for acceleration depending upon the direction of rotation of the vehicle wheel, reversing switch means controlled automatically in accordance with the direction of rotation of the vehicle wheel for causing the current to flow in said circuit in the same direction for rotative deceleration of the vehicle wheel and in the same direction for rotative acceleration of the vehicle wheel notwithstanding a reversal of direction of rotation of the vehicle wheel, a relay having a winding in said circuit which is effective when energized by a current in said circuit exceeding a certain value and corresponding to a rate of rotative deceleration of the vehicle wheel occurring when the wheel slips during an application of the brakes for causing operation of the relay from a non-operated to an operated position, a reversing relay adapted to be actuated from a non-operated to an operated position in response to the operation of said relay to its operated position for reversing the connections of the winding of said relay in said circuit to cause the current flowing in said winding during deceleration of the wheel to be reversed so as to cause the said relay to be returned to its non-operated position and to be responsive thereafter to a current exceeding said certain value occurring subsequently when the vehicle wheel rotatively accelerates back toward a speed corresponding to vehicle speed at a rate exceeding a certain rate, means effective in response to the operation of the reversing relay to its operated position to establish a holding circuit for maintaining the reversing relay in its operated position notwithstanding the return of the relay to its non-operated position, said relay being effective when operated to its operated position in response to the acceleration of the slipping wheel at a rate exceeding said certain rate for interrupting said holding circuit whereby to cause the return of the reversing relay to its non-operated position, and electroresponsive means controlled by said reversing relay and effective while the reversing relay is in its operated position to cause a rapid reduction in the degree of application of the brakes associated with the said wheel and when the said reversing relay is restored to its non-operated position to cause termination of the reduction in the degree of application of the brakes and a reapplication thereof.

19. Brake control apparatus for a wheeled vehicle comprising, in combination, means for causing application and release of the brakes associated with the vehicle wheels, an electrical circuit, means for producing a flow of current in said circuit substantially proportional to the rate of rotative deceleration or rotative acceleration of a vehicle wheel, a relay having an operating winding in said circuit which is effective when energized by a current flowing therethrough in one certain direction and exceeding a certain value occurring only when the said wheel slips to cause operation of the relay from a non-operated to an operated position and which is effective in response to energization by current flowing in the opposite direction to restore the relay from its operated to its non-operated position, reversing switch means controlled according to the direction of rotation of the vehicle wheel for causing the current to flow in said circuit in such a direction that the winding of the said relay is energized by current flowing in said one direction while the vehicle wheel is decelerating and in the opposite direction while the vehicle wheel is accelerating, a slow-release relay having an operating winding that is normally energized, under the control of said relay while in its non-operated position, to cause operation of the slow-release relay from its non-operated to its operated position, a reversing relay having an operating winding that is energized in response to the operation of the said relay to its operated position while the slow-release relay is in its operated position, said reversing relay being operated from its non-operated to its operated position in response to energization of the operating winding thereof and restored from its operated to its non-operated position in response to deenergization of the operating winding, the reversing relay being effective when operated to its operated position to reverse the connections of the winding of said relay in said circuit to cause the current flowing in said circuit during deceleration of the wheel to be reversed so as to cause said relay to be returned to its non-operated position and to be responsive thereafter to a current exceeding said certain value occurring while the slipping vehicle wheel rotatively accelerates back toward a speed corresponding to vehicle speed, means effective when the reversing relay is operated to its operated position for establishing a holding circuit including the slow-release relay in its operated position for maintaining the operating winding of the reversing relay energized notwithstanding restoration of said relay to its non-operated position, said relay being effective when operated to its operated position in response to the acceleration of the slipping wheel for effecting deenergization of the operating winding of the said slow-release relay so as to cause said slow-release relay to interrupt said holding circuit and effect the restoration of the reversing relay to its non-operated position, and electro-responsive means controlled by said reversing relay and effective while the reversing relay is in its operated position to cause a rapid reduction in the degree of application of the brakes associated with the said vehicle wheel and when the said reversing relay is restored to its non-operated position to cause termination of the reduction in the degree of application of the brakes and reapplication thereof.

CLAUDE M. HINES.